United States Patent Office 3,446,839
Patented May 27, 1969

3,446,839
PRODUCTION OF ALKYL HYDROXY-PIVALATES
Jurgen F. Falbe, Bonn, Germany, and Nicolaas Huppes, Amsterdam, Netherlands, assignors to Shell Oil Company, New York, N.Y., a corporation of Delaware
No Drawing. Filed Feb. 18, 1966, Ser. No. 528,397
Claims priority, application Germany, Sept. 22, 1965, S 99,581
Int. Cl. C07c 69/66
U.S. Cl. 260—484                                    6 Claims

ABSTRACT OF THE DISCLOSURE

Process of initially reacting an alkyl methacrylate, carbon monoxide, and hydrogen in the presence of a rhodium-containing catalyst and a tertiary phosphine to produce α-formylisobutyrates and then raising the temperature to produce alkyl hydroxypivalates, thereby hydroformylating and hydrogenating sequentially in one operation without a change of catalyst or gas.

---

This invention relates to an improved method for the production of hydroxypivalic acid esters.

A method for the production of the ethyl ester of hydroxypivalic acid, i.e., the ethyl ester of 2,2-dimethyl-3-hydroxypropionic acid, is known in the art. Rothstein et al., J. Chem. Soc., 1948 (1949), describe the production of ethyl hydroxypivalate by a cumbersome and uneconomic method which comprises reacting the α-bromoisobutyric acid ester with a form of formaldehyde and zinc.

It is an object of the present invention to provide an improved method for the production of esters of hydroxypivalic acid esters. More particularly it is an object to provide an improved process for the production of alkyl hydroxypivalates.

It has now been found that these objects are accomplished by the process of initially contacting an ester of methacrylic acid with carbon monoxide and hydrogen in the presence of certain rhodium-containing catalysts under controlled reaction conditions and subsequently hydrogenating the product resulting therefrom.

The hydroformylation of methacrylate esters under other conditions is known in the art. For example, Falbe et al., Chem. Ber., 97, 877 (1964) report that hydroformylation of methyl methacrylate in the presence of a cobalt catalyst affords a 51% yield of α-methyl-γ-butyrolactone as well as a 42% yield of methyl isobutyrate, the product resulting from hydrogenation of the ester reactant. This reference, as well as others, illustrates a high selectivity to β-hydroformylated products in accord with the rule of Keulemans et al., Receuil, 67, 298 (1948) that quaternary carbon atoms are not formed during hydroformylation processes. However, in contrast, the hydroformylation process of the invention is characterized by the formation of an α-hydroformylated product wherein a quaternary carbon atom has been formed, in direct contradiction of the rule of Keulemans et al.

The methacrylate ester reactant employed in the process of the invention is an ester of the formula

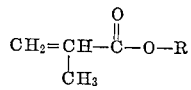

wherein R is alkyl of up to 20 carbon atoms. Illustrative alkyl R groups include acyclic alkyl groups such as methyl, ethyl, isopropyl, sec-butyl, amyl, hexyl, octyl, lauryl and stearyl as well as cycloalkyl groups, preferably of from 5 to 13 carbon atoms, such as cyclopentyl, cyclohexyl, 2,3,5-trimethylcyclopentyl, cyclooctyl, cyclododecyl, cyclohexylmethyl, and cyclooctylmethyl. Although the success of the process is not dependent upon the alkyl moiety of the methacrylate ester, best results are obtained when a lower acyclic alkyl methacrylate is employed, that is, an ester of the above formula wherein R is acyclic alkyl of up to 6 carbon atoms. Particularly preferred as the ester reactant is methyl methacrylate.

To effect hydroformylation, the ester reactant is contacted with carbon monoxide and hydrogen. No special precautions are required with regard to these materials and commercially available grades are satisfactory. The molar ratio of carbon monoxide to hydrogen is not critical and molar ratios from about 4:1 to about 1:4 are satisfactorily employed. Generally preferred, however, are molar ratios from about 2:1 to about 1:2. The hydrogen and carbon monoxide are suitably charged to the reaction system as such although it is also useful to employ commercial mixtures of these gaseous reactants, e.g., synthesis gas.

The catalyst is a rhodium carbonyl catalyst optionally modified by the presence of tertiary phosphine. In one modification, the rhodium-containing catalyst is employed in the substantial absence of complexing ligands other than carbonyl. The rhodium carbonyl is suitably introduced as a preformed material or is formed in situ by reaction of some other form of rhodium with the other reaction mixture components. Thus, the rhodium is provided as the metal, or as the salt of an organic or inorganic acid, e.g., rhodium chloride, rhodium nitrate, rhodium napthenate or rhodium octanoate. In yet another and frequently preferred modification, the rhodium is introduced in the form of the oxide, $Rh_2O_3$. Although the precise catalytically active species is not known with certainty, it is considered that regardless of the form in which the rhodium is provided, reaction with the carbon monoxide and/or the hydrogen present in the reaction system results in the formation of a rhodium carbonyl catalyst.

In the preferred modification of the invention, the rhodium carbonyl catalyst is modified by the presence of tertiary phosphine. Phosphines that are suitably employed as catalyst modifiers are preferably hydrocarbon monophosphines of up to 20 carbon atoms which are free from acetylenic unsaturation. Illustrative of such tertiary phosphines are trialkyl phosphines including triethylphosphine, tributylphosphine, dimethyllaurylphosphine, propylbutyloctylphosphine and dibutyldecylphosphine; aromatic phosphines such as triphenylphosphine, phenyldiethylphosphine, propyldi(tolyl)phosphine, dibutylnaphthylphosphine and diphenylhexylphosphine; and heterocyclic phosphines such as 1-hexylphospholine, 1-phenylphospholane, 1 - ethylphospholidine, 1 - phenylphosphorinane, 4,4 - dimethyl-1-phenylphosphorinane, 3,6-dimethyl-1-phenylphosphepane, 9-butyl-9-phosphabicyclo(4.2.1)nonane and 9-phenyl-9-phosphabicyclo(3.3.1)nonane. Preferred tertiary phosphine catalyst modifiers are trialkylphosphines wherein each alkyl is alkyl of up to 8 carbon atoms. Particularly preferred as the tertiary phosphine catalyst modifier is tributylphosphine. When present, amounts of tertiary phosphine up to about 20% by weight based on the methacrylic acid ester are satisfactory. As previously stated, no tertiary phosphine is required, but best results are obtained when at least 0.1% by weight of tertiary phosphine based on the methacrylate ester is present.

The rhodium is employed in catalytic quantities, preferably in amounts from about 0.0001 gram-atom to about 0.01 gram-atom per mole of methacrylate ester and particularly in amounts from about 0.0004 gram-atom to about 0.004 gram-atom per mole of methacrylate ester.

The hydroformylation process is conducted in an inert solvent and solvents which are liquid at reaction temperature and pressure and are inert to the reactants as well as the lactone product are suitably employed. Illustrative solvents include ethers such as dibutyl ether, dioctyl ether, anisole and diphenyl ether; and esters such as methylbenzoate, diethylphthalate and hexylbutyrate. Preferred inert solvents are hydrocarbons free from aliphatic unsaturation such as benzene, toluene, cyclohexane, decahydronaphthalene, dodecane and heptane. The amount of solvent is not critical but typically weight ratios of solvent to methacrylate ester from about 1:1 to about 6:1 are employed.

The process of $\alpha$-methyl-$\gamma$-lactone production comprises initially contacting the methacrylate ester reactant with hydrogen and carbon monoxide in the presence of the rhodium catalyst and subsequently hydrogenating the initial hydroformylation product. The temperature at which the initial hydroformylation is conducted is somewhat critical and temperatures from about 80° C. to about 120° C. provide generally satisfactory results. In the modification of the process wherein tertiary phosphine catalyst modifiers are employed, somewhat higher reaction temperatures may be utilized, e.g., up to about 135° C. The initial hydroformylation process is conducted at superatmospheric pressure and reaction pressures from about 100 atmospheres to about 2000 atmospheres are satisfactory although preferred reaction pressures vary from about 350 atmospheres to about 1000 atmospheres. The reactants and catalyst are contacted in any convenient manner. In one process modification, the ester reactant, solvent and catalyst are charged to an autoclave or similar reactor which is then pressurized with the gaseous reactants. In an alternate modification, the reactants and catalyst are contacted in a continuous operation as by effecting the contacting during passage through an elongated reactor.

At the conclusion of the hydroformylation reaction, the initial hydroformylation product comprises an $\alpha$-formylisobutyrate ester corresponding to the methacrylate ester reactant. To produce the desired hydroxy-ester product, the $\alpha$-formylisobutyrate ester is hydrogenated.

In one modification, the hydrogenation is conducted as a separate operation after isolation of the hydroformylation product. At the conclusion of the hydroformylation procedure the reactor is cooled and vented and the rhodium catalyst is removed by conventional methods as by filtration, centrifugation or water washing. The initial hydroformylation product is freed from solvent as by distillation of the solvent therefrom at a reduced pressure and is then hydrogenated by contact with molecular hydrogen in a conventional manner.

Illustrative conventional hydrogenation catalysts include Group VIII transition metals such as platinum, palladium, nickel and cobalt or metal oxide catalysts such as palladium oxide, platinum oxide and copper chromite. Suitable temperatures for the separate hydrogenation process are from about 20° C. to about 250° C. when employed in conjunction with hydrogen pressures from about 1 atmosphere to about 400 atmospheres. In this modification where hydrogenation is conducted subsequent to separation of the initial hydroformylation product, conventional hydrogenation solvents are employed, e.g., alcohols, esters and the like, particularly alkanols of up to 10 carbon atoms such as methanol, ethanol, isopropanol, n-hexanol, octanol and decanol.

In the preferred modification of the process, however, the hydrogenation is conducted without separating the initial hydroformylation product from the rhodium catalyst and solvent. In this modification, at the conclusion of the initial hydroformylation the temperature is raised to at least 180° C. but no higher than about 250° C., preferably no higher than about 210° C., and the unreacted hydrogen component of the initial product mixture serves to effect the desired hydrogenation. It is seldom necessary to alter the pressure of hydrogen in the system although the hydrogen pressure at which hydrogenation is conducted should be at least 100 atmospheres, preferably at least 150 atmospheres, and additional hydrogen is added if required. There is no critical limitation on the maximum pressure used, and the hydrogen pressure may be as high as 2000 atmospheres or higher. The presence in the reaction system of unreacted carbon monoxide does not appear to be detrimental, the carbon monoxide serving only as an inert diluent.

The preferred method of operation, i.e., conducting the hydrogenation without separation of the initial product mixture, offers a substantial advantage with regard to catalyst separation and recovery. At the conclusion of reaction the pressure is released and the mixture is cooled, whereupon the rhodium catalyst decomposes and is deposited as a powder in substantially quantitative yield. The rhodium is easily recoverable, as by filtration, and may be recycled without further treatment. Under similar conditions, cobalt catalysts form cobalt mirrors and encrustations and considerable difficulty is obtained in reusing such cobalt residues. The hydroxypivalate ester product is separated from the product mixture by conventional procedures as by fractional distillation, selective extraction, fractional crystallization and the like.

The product of the process of the invention is an ester of hydroxypivalic acid corresponding to the methacrylate ester reactant employed. For example, from methyl methacrylate is produced methyl hydroxypivalate and from decyl methacrylate is produced decyl hydroxypivalate. The hydroxypivalate ester products find utility as high boiling reaction solvents and are transesterified to produce polyester polymers useful in synthetic fiber production.

To further illustrate the improved process of the invention, the following examples are provided. It should be understood that the details thereof are not to be regarded as limitations as they may be varied as will be understood by one skilled in this art.

EXAMPLE I

To an autoclave was charged 500 g. of ethyl methacrylate, 2500 g. of benzene, 0.2 g. of rhodium oxide and 5 g. of tributylphosphine. The reactor was pressurized with an equimolar mixture of carbon monoxide and hydrogen to a pressure of 300 atmospheres while the reaction mixture was maintained at 120° C. After a reaction time of 10 hours the autoclave was cooled to room temperature and vented. The catalyst decomposition products were removed by filtration and the solvent was removed by distillation. The resulting mixture was distilled to afford ethyl $\alpha$-formylisobutyrate, B.P. 60° C. at 12 mm. $n_D^{20}=1.4150$, in a yield of 82% of theory. The product had the following elemental analysis.

*Analysis.*—Calc'd. (percent wt.): C, 58.3; H, 9.39. Found: C, 58.4; H, 8.7.

A 300 g. sample of ethyl $\alpha$-formylisobutyrate, 900 ml. of ethanol and 10 g. of Raney nickel were charge to an autoclave and contacted with molecular hydrogren at 65° C. and a hydrogen pressure of 80 atmospheres for a 2 hour period. The resulting yield of ethyl hydroxypivalate, B.P. 88° C. at 12 mm., $n_D^{20}=1.4235$, was 88% of theory. The product had the following elemental analysis.

*Analysis.*—Calc'd (percent wt.): C, 57.5; H, 9.65. Found: C, 57.3; H, 9.4.

EXAMPLE II

The procedure of Example I was employed to hydroformylate 100 g. of cyclooctylmethyl methacrylate in 400 g. of benzene in the presence of 0.1 g. of rhodium oxide and 2.5 g. of tributylphosphine at a temperature of 120° C. and a carbon monoxide-hydrogen (molar ratio of 1:1) pressure of 300 atmospheres over a 5 hour period. The yield of cyclooctylmethyl $\alpha$-formylisobutyrate, B.P. 158° C. at 10 mm., $n_D^{20}=1.4693$, was 79%. The product had the following elemental analysis.

*Analysis.*—Calc'd (percent wt.): C, 69.69; H, 10.7. Found: C, 70.4; H, 10.4.

The initial ester product was hydrogenated with Raney nickel in methanol at 100° C. and a hydrogen pressure of 80 atmospheres. A yield of 87% of theory of cyclooctylmethyl hydroxypivalate was obtained, B.P. 170–174° C.

at 10 mm., $n_D^{20}$=1.4781. The product, believed to be a novel compound, had the following elemental analysis.

*Analysis.*—Calc'd (percent wt.): C, 69.38; M, 10.81. Found: C, 71.2; H, 10.9.

EXAMPLE III

According to the procedure of Example II, a quantity of 300 g. of n-butyl methacrylate dissolved in 1200 g. of benzene was hydroformylated in 4 hours in the presence of 0.2 g. rhodium oxide and 5 g. tributylphosphine at 120° C. and a carbon monoxide-hydrogen (1:1) pressure of 300 atmospheres. The yield of n-btuyl α-formylisobutyrate, B.P. 85° C. at 10 mm., was 91%. The product had the following elemental analysis.

*Analysis.*—Calc'd (percent wt.): C, 62.76; H, 9.36. Found: C, 63.0; H, 9.7.

Hydrogenation of the ester product with a Raney nickel catalyst yielded 88% of theory of n-butyl hydroxypivalate, B.P. 96° C. at 12 mm., $n_D^{20}$=1.4288. The product, believed to be a novel compound, had the following elemental analysis.

*Analysis.*—Calc'd (percent wt.): C, 62.04; H, 10.41. Found: C, 61.8; H, 10.4.

EXAMPLE IV

By the procedure of Example III, n-hexyl methacrylate was hydroformylated to afford n-hexyl α-formylisobutyrate, B.P. 108° C. at 10 mm., in a yield of 83%. The product had the following elemental analysis.

*Analysis.*—Calc'd (percent wt.): C, 65.97; H, 10.7. Found: C, 66.0; H, 10.0.

Hydrogenation of this product with Raney nickel in methanol yielded 97% of n-hexyl hydroxypivalate, B.P. 130° C. at 10 mm. The product, believed to be novel, had the following elemental analysis.

*Analysis.*—Calc'd (percent wt.): C, 65.31; H, 10.96. Found: C, 65.3; H, 11.1.

EXAMPLE V

By the procedure of Example III, n-octyl methacrylate was hydroformylated to afford n-octyl α-formylisobutyrate, B.P. 142° C. at 12 mm., $n_D^{20}$=1.4320, in a yield of 91%. The product had the following elemental analysis.

*Analysis.*—Calc'd (percent wt.): C, 68.38; H, 10.5. Found: C, 68.3; H, 10.6.

Hydrogenation of this product with Raney nickel in n-octanol yielded 88% of theory of n-octyl hydroxypivalate, B.P. 146° C. at 10 mm., $n_D^{20}$=1.4392. This product, believed to be a novel compound, had the following elemental analysis.

*Analysis.*—Calc'd (percent wt.): C, 67.78; H, 11.38. Found: C, 68.0; H, 11.7.

EXAMPLE VI

By the procedure of Example III, a 91% of n-lauryl hydroxypivalate, B.P. 148° C. at 0.4 mm., was obtained upon hydroformylation and subsequent hydrogenation of n-lauryl methacrylate. This product, believed to be a novel compound, had the following elemental analysis.

*Analysis.*—Calc'd (percent wt.): C, 71.28; H, 11.96. Found: C, 71.3; H, 11.6.

EXAMPLE VII

By the procedure of Example III, a 38% yield of cyclohexylmethyl hydroxypivalate, B.P. 143° C. at 10 mm., $n_D^{20}$=1.4647, was obtained upon hydroformylation and subsequent hydrogenation of cyclohexylmethyl methacrylate. This product, believed to be a novel compound, had the following elemental analysis.

*Analysis.*—Calc'd (percent wt.): C, 67.35; H, 10.35. Found: C, 67.7; H, 10.4.

EXAMPLE VIII

The procedure of Example I was followed to conduct a series of runs wherein methyl methacrylate, dissolved in 4 parts by weight of solvent per part of methyl methacrylate, was contacted with carbon monoxide and hydrogen. The solvent was benzene in each run except for Run 6 wherein tetrahydrofuran was employed. The initial hydroformylation was conducted under the conditions identified as *a* in each run. At the conclusion of the hydroformylation the temperature was raised and hydrogenation was effected at the conditions identified as *b* without product separation. The hydrogenation mixture was subsequently worked up in conventional manner by cooling, venting, filtering and distilling. The results of this series are shown in Table I wherein the term "yield" refers to yield of methyl hydroxypivalate based on methyl methacrylate charged.

TABLE I

| Run | Methyl methacrylate, g. | Molar ratio CO/H₂ | Rh₂O₃, g. | Temp., °C. | Pressure, atm. | Time, hrs. | Yield |
|---|---|---|---|---|---|---|---|
| 1 | 100 | 1/1 | 0.1 | a, 80<br>b, 230 | a, 1,000<br>b, 1,000 | a, 7<br>b, 4 | 93.1 g.<br>71% |
| 2 | 100 | 1/1 | 0.1+2.5 g. of tributylphosphine | a, 80–90<br>b, 200 | a, 1,000<br>b, 1,000 | a, 5<br>b, 3 | 94 g.<br>71.5% |
| 5 | 300 | 1/1 | 0.2+5 g. of 1-phenylphospholine | a, 80–130<br>b, 230–240 | a, 200<br>b, 300 | a, 7<br>b, 20 | 84 g.<br>32% |
| 6 | 100 | 1/4 | 0.1+2.5 g. of 1-phenylphospholane | a, 130–140<br>b, 230 | a, 200<br>b, 300 | 23<br>11 | 40 g.<br>30.5% |
| 5 | 100 | 1/2 | 0.1+2.5 g. of tributylphosphine | a, 120<br>b, 210 | a, 400<br>b, 400 | a, 3<br>b, 12 | 109 g.<br>83% |
| 6 | 100 | 1/1 | 0.1+5 g. of tributylphosphine | a, 130<br>b, 210 | a, 200<br>b, 300 | a, 3<br>b, 20 | 61 g.<br>47% |

Methyl hydroxypivalate, believed to be a novel compound has a boiling point of 65° C. at 10 mm. and a refractive index, $n_D^{20}$ of 1.4281.

EXAMPLE IX

A series of runs was made wherein 100 g. of methyl methacrylate in 400 g. of benzene was hydroformylated by contact with an equimolar mixture of carbon monoxide and hydrogen at various pressures. In Runs 1–4 the hydroformylation was conducted at 80° C. in the presence of 0.1 g. of rhodium oxide and in Runs 5–9 the hydroformylation was conducted at 120–130° C. in the presence of 0.1 g. of rhodium oxide and 2.5 g. of tributylphosphine. The results of this series are shown in Table II wherein the percentages represent the yield of methyl α-formylisobutyrate obtained under the indicated conditions.

TABLE II

| Pressure, atm | 200 | 250 | 300 | 400 | 500 | 1,000 |
|---|---|---|---|---|---|---|
| Runs 1–4, percent | 42 | | | 48 | 52 | 72 |
| Runs 5–9, percent | 65 | 74 | 80 | 91 | | 92 |

We claim as our invention:

1. The process of producing an alkyl hydroxypivalate which comprises initially intimately contacting (a) alkyl methacrylate wherein the alkyl is alkyl of up to 20 carbon atoms, (b) carbon monoxide, and (c) from about 0.25 mole to about 4 moles of hydrogen per mole of carbon monoxide in liquid-phase solution in inert solvent in the presence of from about 0.0001 gram-atom to about 0.01 gram-atom of rhodium catalyst per mole of methacrylate ester and up to about 20% by weight based on the methacrylate ester of a tertiary phosphine, at a temperature from about 80° C. to about 120° C. and a pressure from about 100 atmospheres to about 2000 atmospheres; and subsequently maintaining the resulting mixture at a temperature of from about 180° C. to about 250° C. thereby hydrogenating the α-formylisobutyrate ester product resulting from said initial intimate contacting.

2. The process of claim 1 wherein the amount of said tertiary phosphine is at least 0.1% by weight based on the methacrylate ester.

3. The process of claim 2 wherein the tertiary phosphine is trialkylphosphine wherein each alkyl is alkyl of up to 8 carbon atoms.

4. The process of claim 3 wherein the trialkylphosphine is tributylphosphine.

5. The process of claim 2 wherein the temperature of said initial contacting is from about 80° C. to about 135° C.

6. The process of claim 1 wherein the rhodium is provided as rhodium oxide.

References Cited
UNITED STATES PATENTS

| | | | |
|---|---|---|---|
| 2,880,241 | 3/1959 | Hughes | 260—604 |
| 2,983,734 | 5/1961 | Sargent | 260—484 XR |
| 3,176,038 | 3/1965 | Zachry et al. | 260—484 XR |
| 3,239,566 | 3/1966 | Slaugh et al. | 260—604 |
| 3,253,018 | 5/1966 | Zachry et al. | 260—484 XR |

OTHER REFERENCES

Tsuji: The Journal of the Society of Organic Synthetic Chemistry, Japan, vol. 22, pp. 892–893, November 1964.

LORRAINE A. WEINBERGER, *Primary Examiner.*

A. G. HALLUIN, *Assistant Examiner.*

U.S. Cl. X.R.

260—343.6, 483